United States Patent [19]

Sugiyama et al.

[11] 4,419,710
[45] Dec. 6, 1983

[54] CASE FOR A DISC-SHAPED RECORDING MEDIUM

[75] Inventors: Hiroyuki Sugiyama, Isehara; Masaki Sakurai; Ryuzo Abe, both of Yokohama; Yasuhiro Yusa, Fujisawa; Kenji Yoshihara, Chiba, all of Japan

[73] Assignee: Victor Company of Japan, Ltd., Yokohama, Japan

[21] Appl. No.: 288,291

[22] Filed: Jul. 30, 1981

[30] Foreign Application Priority Data

Jul. 31, 1980 [JP] Japan ........................ 55-108490[U]

[51] Int. Cl.³ ..................... G11B 25/04; G11B 5/82; B65D 85/30
[52] U.S. Cl. .................................. 360/133; 206/444
[58] Field of Search .................. 360/133, 135, 86, 97, 360/99, 69, 71; 206/444, 309, 312

[56] References Cited

U.S. PATENT DOCUMENTS

| | | | |
|---|---|---|---|
| 3,662,360 | 5/1972 | Lambert | 360/97 |
| 4,138,703 | 2/1979 | Stave et al. | 360/133 |
| 4,164,782 | 8/1979 | Stewart | 360/133 |
| 4,239,108 | 12/1980 | Coleman et al. | 360/86 |
| 4,352,175 | 9/1982 | Crooks | 360/133 |

*Primary Examiner*—Alfred H. Eddleman
*Attorney, Agent, or Firm*—Louis Bernat

[57] ABSTRACT

A case for a disc-shaped recording medium is used in a disc-shaped recording medium reproducing apparatus. The reproducing apparatus is provided with a turntable for rotating the disc-shaped recording medium, closing member locking mechanism provided at the innermost part of the disc-shaped recording medium reproducing apparatus, and N detection switches provided at the innermost part of the reproducing apparatus and disposed asymmetrically on the left and right sides with respect to a line which passes through the center of the turntable in the disc insertion direction. The case comprises a jacket for accommodating the disc-shaped recording medium, and a closing member for closing an opening of the jacket and being locked by the locking mechanism and confront the detection switches upon the disc-shaped recording medium being loaded into the reproducing apparatus. The closing member has cutout desired areas symmetrical on the left and right sides each of which consists of N desired sections where cutouts for discrimination are to be formed. The cutout desired sections for discrimination at symmetrical positions on the left and right side are brought into confront the same detection switch out of the N detection switch when the closing member is reversed up and down together with the jacket and the disc-shaped recording medium. One cutout desired section out of the pair of cutout desired sections symmetrical on the left and right sides has a cutout or a non-cutout for discriminating peculiality of a first side of the disc-shaped recording medium, and the other cutout desired section having a cutout or a non-cutout for discriminating peculiality of a second side of the disc-shaped recording medium.

5 Claims, 5 Drawing Figures

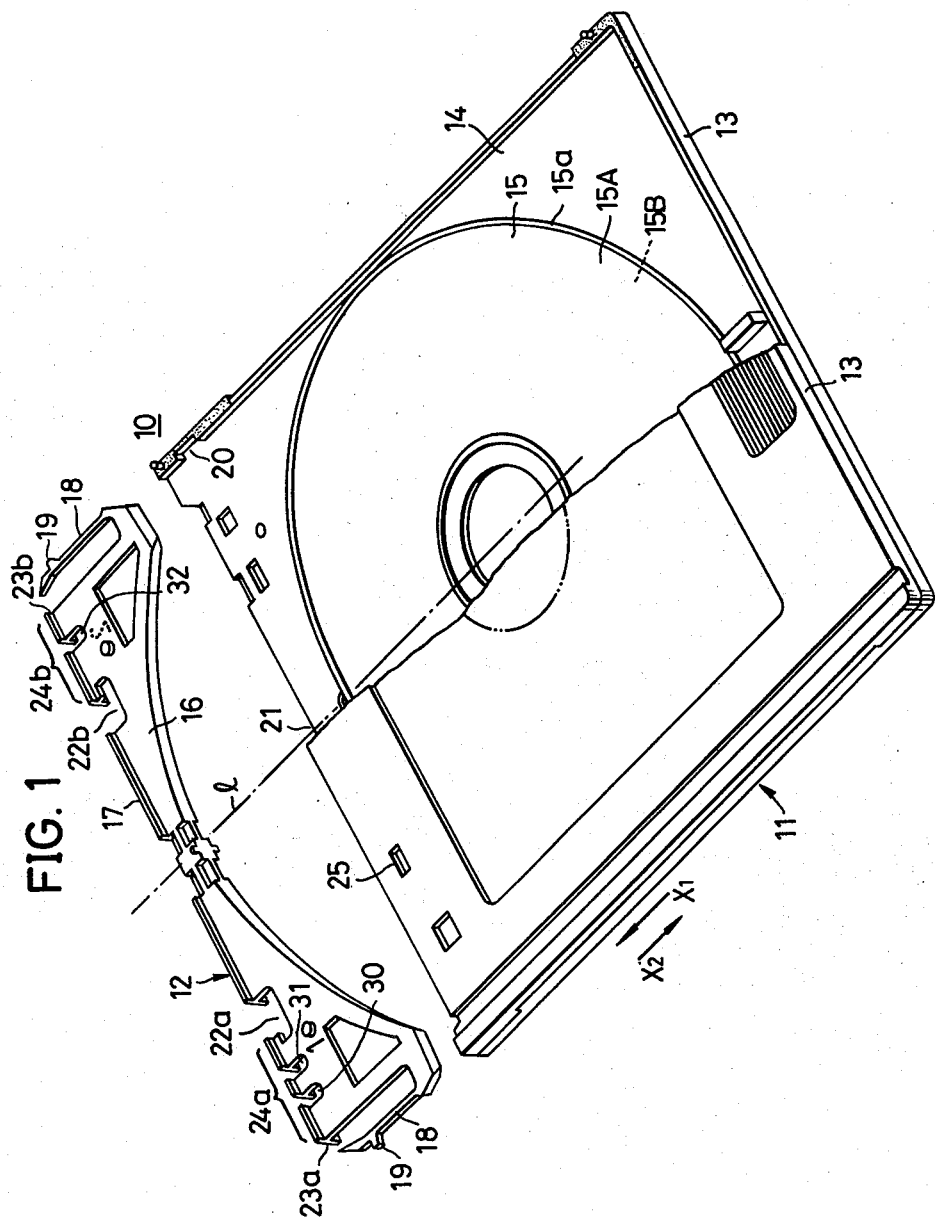

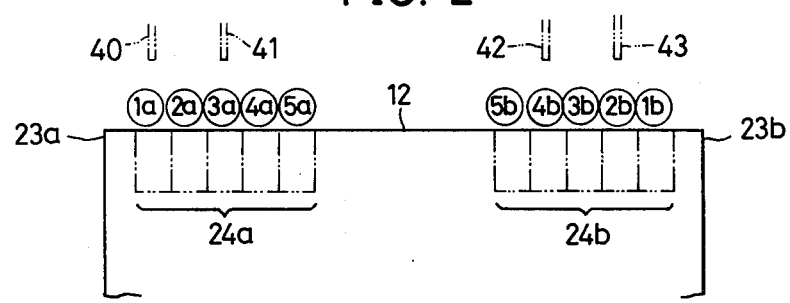
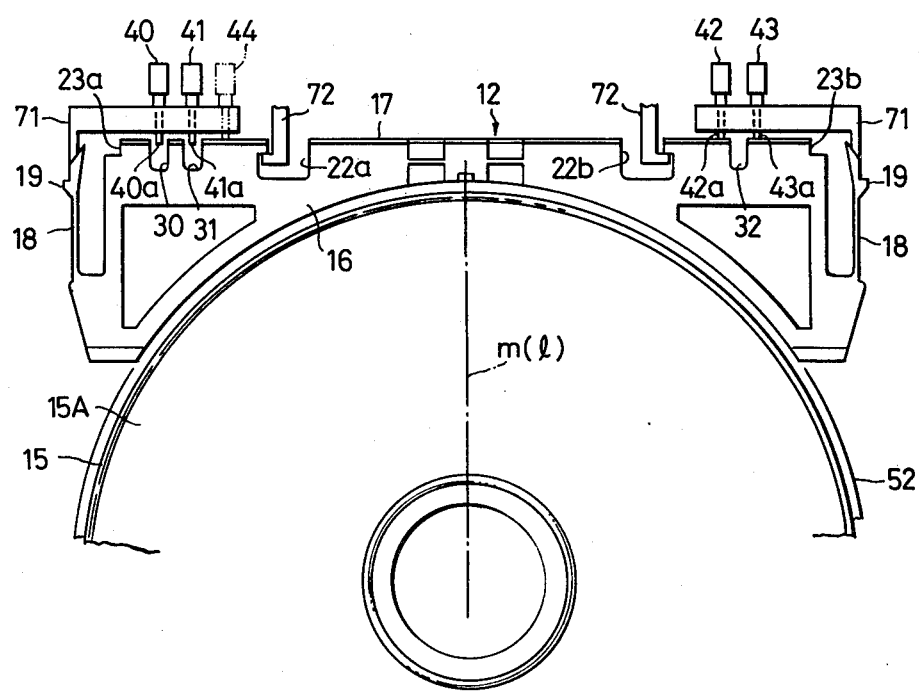

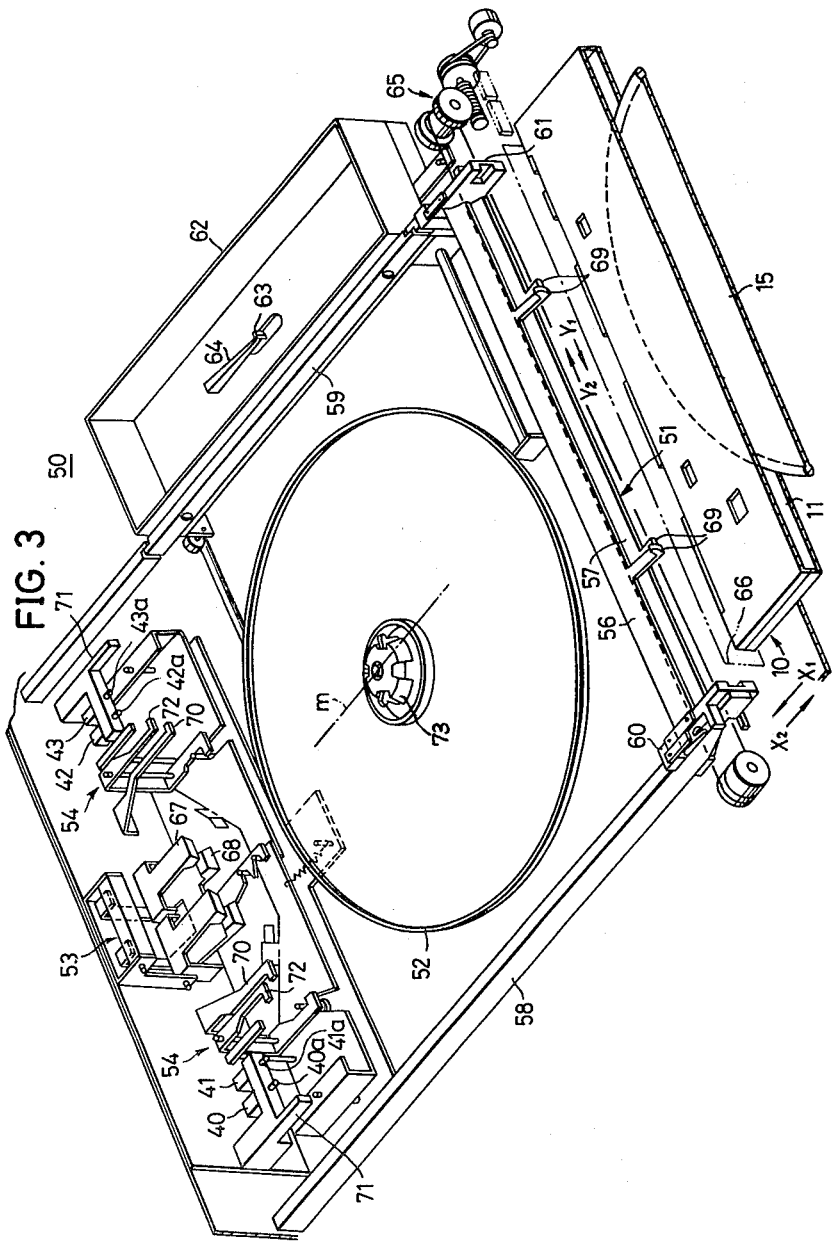

CASE FOR A DISC-SHAPED RECORDING MEDIUM

BACKGROUND OF THE INVENTION

The present invention generally relates to cases for disc-shaped recording mediums, and more particularly to a case for a disc-shaped recording medium comprising a jacket for accommodating a disc-shaped recording medium and a closing member for closing an opening of the jacket, and in which the closing member has a construction capable of distinguishing types of the disc-shaped recording medium, and reproducing side of the medium, and the like, in cooperation with detection switches disposed asymmetrically on the left and right sides with respect to a center of a reproducing apparatus.

Generally, a disc-shaped recording medium (hereinafter referred to as "disc") which is recorded with information signals such as a video signal and an audio signal with high density, is accommodated within a disc case in order to protect the surface of the disc from dirt, scratches, and the like. Conventionally, there was a disc case comprising a rigid jacket for accommodating a disc, and a tray having a front part which is engaged by engaging means upon complete insertion of the disc case within a reproducing apparatus and an annular or ring portion fixed to the front part for encircling the outer periphery of the disc. The above reproducing apparatus which operates together with the disc case accommodating the disc, is constructed so that when this disc case is inserted within the reproducing apparatus to a predetermined position, the engaging means of the reproducing apparatus engages to and holds onto the front part of the tray. Hence, when the jacket is pulled out from within the reproducing apparatus, the disc is held by the annular portion of the tray and relatively slipped out from the jacket at the above predetermined position, and the outer peripheral edge part of the disc rests on and is supported by a supporting mechanism within the reproducing apparatus. Then, a turntable relatively rises within the inner side of the supporting mechanism, and the disc is placed onto and is unitarily rotated with the turntable, to perform the reproduction. After completion of the reproduction, when the empty jacket is inserted into the reproducing apparatus, the disc is relatively inserted into the jacket together with the annular portion of the tray, and the engagement of the engaging means is released. Accordingly, when the jacket is pulled out from the reproducing apparatus, the disc and the tray is obtained outside the reproducing apparatus together with the jacket in a state in which the disc and the tray is incased inside the jacket.

In the above reproducing apparatus, when the disc is placed on the turntable, the disc is not visible from the outside. Accordingly, it is not possible to recognize by naked eyes from the outside whether the disc is being loaded or not, whether a disc side to be reproduced is a first side or a second side of the disc, whether the recorded signal is a television signal or a PCM audio signal, whether the audio signal is stereo or monaural.

Accordingly, in U.S. patent application Ser. No. 229,303, now U.S. Pat. No. 4,360,845, entitled "CASE FOR A DISC-SHAPED RECORDING MEDIUM" in which the assignee is the same as that of the present application, a case for a disc-shaped recording medium was proposed in which a closing member for closing an opening of a jacket has a shape having cutouts formed at specific positions in accordance with peculiarity of a disc accommodated inside the jacket. When the disc is loaded into the reproducing apparatus, microswitches confronting the cutouts of the closing member remain OFF and microswitches confronting non-cutout part of the closing member are pushed and are turned ON. According to output from the microswitches, there can be obtained signals such as disc side detection signal.

In this case, the closing member is required to be formed with a pair of cutout and non-cutout, disposed at left and right sides along the front side, for each item to be discriminated, which item includes item for discriminating whether the disc is being loaded or not. In connection with it, for the reproducing apparatus, a pair of microswitches is needed for every item to be distinguished.

Thus, when the items to be distinguished become large, a large number of pairs of cutout and non-cutout regions must be formed in the closing member.

On the other hand, since the closing member has cutouts of large-size to be engaged with locking means, formed at the front edge thereof, a space for forming the cutout and non-cutout for discrimination is rather narrow. Additionally, when disposing the microswitches sideways in a line, intervals provided between adjacent microswitches cannot be set so small. Therefore, the number of pair of cutout and non-cutout actually formed on the closing member is limited to a rather small value, and the number of items of discrimination is insufficient, thereby being not able to cope with the actual requirement.

Furthermore, as for the reproducing apparatus, since it requires a pair of microswitches for each discrimination item, a large number of microswitches are required; therefore a circuit becomes complex and the reproducing apparatus becomes expensive.

Still furthermore, since intervals between the adjacent cutout and non-cutout, and between the actuating pins of the adjacent microswitches become narrow inevitably, even there easily occurs error in discrimination operation caused by a probable very small error in position of the lid plate locked in the reproducing apparatus.

SUMMARY OF THE INVENTION

Accordingly, a general object of the present invention is to provide a novel and useful disc case in which the above described problems have been overcome.

Another and more specific object of the present invention is to provide a disc case in which a closing member has a single section where cutout is desired to be formed for each discrimination item, and a desired cutout section remains as it is, i.e., non-cutout or is cut off to be a cutout, thus being capable of discriminating the above listed items, in cooperation with the microswitches on the reproducing apparatus.

Still another object of the present invention is to provide a disc case in which no section for forming non-cutout, for detecting that the disc has been loaded within the reproducing apparatus, is required in the closing member.

Other objects and further features of the present invention will be apparent from the following detailed description when read in conjunction with the accompanying drawings.

BRIEF DESCRIPTION OF THE DRAWINGS

FIG. 1 is a disassembled perspective view showing an embodiment of a disc case according to the present invention, with a part cut away and disassembled;

FIG. 2 is a diagram for showing positions where cutouts for discrimination are to be formed in a lid plate of FIG. 1;

FIG. 3 is a perspective view showing one example of a disc reproducing apparatus, with a part cut away and with a top cover removed off;

FIG. 4 is a plan view showing a positional relationship between a lid plate and corresponding detection switches, in a state where the disc has been loaded with a first side to be reproduced facing up.

DETAILED DESCRIPTION

Figure 5:
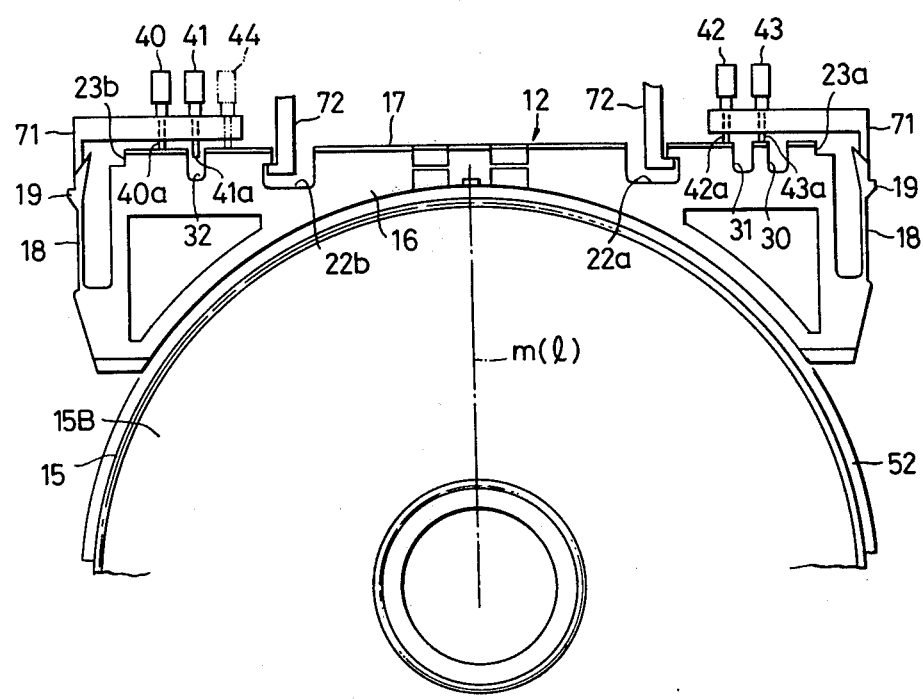
FIG. 5 is a plan view showing a positional relationship between a lid plate and corresponding detection switches, in a state where the disc has been loaded with a second side to be reproduced facing up.

In FIG. 1, a disc case 10 comprises a jacket 11 and a lid plate 12. The jacket 11 is assembled from a pair of jacket halves 13 and 13, and comprises a flat cavity or space 14 therein. This space 14 accommodates a disc 15. This disc 15 has a first side 15A facing up and a second side 15B facing down as viewed in FIG. 1.

The lid plate 12 comprises a plate-shaped main lid body 16, and a rim portion 17 formed unitarily at the front edge of the main lid body 16. The lid plate 12 is inserted into the opening 21 of the jacket 11, with projections 19 on each of engaging arms 18 engaged with corresponding depression 20 of the jacket 11, thus being prevented from slipping out from the jacket 11. At the front edge of the lid plate 12, a pair of cutouts 22a and 22b to be engaged by locking arms when locking the lid plate 12 are formed at positions separated from and symmetrical on the left and right sides with respect to a center of the lid plate 12.

As will be understood in further reference with FIG. 2, in the above lid plate 12, an area between the cutout 22 and the left-side edge 23a is assigned to a first area 24a intended or desired to form cutouts, and an opposite area between the cutout 22b and the right-side edge 23b is assigned to a second area 24b intended to form cutout, where cutouts or non-cutouts are formed corresponding to the disc accommodated within the case as will be described far below.

The first and second cutouts desired areas 24a and 24b are respectively divided into five sections at equal intervals. These sections are designated by marks (1a), (1b) - (5a), (5b), in order from the lateral sides to the center of the lid plate 12. Each pair of left and right sections (1a) and (1b), -, (5a) and (5b) are disposed symmetrially on the left and right sides with respect to a line l which passes through the center of the disc 15 in the disc inserting direction (shown by an arrow X1). Each section is formed as cutout or non-cutout, in accordance with the characteristics of the disc accommodated inside the case.

According to the present embodiment, the sections (1a) and (1b) are used for distinguishing between sides of the disc, the sections (2a) and (2b) for distinguishing between video disc and audio disc, the sections (3a) and (3b) for distinguishing whether the recorded audio signal is stereo or monaural, and the sections (4a) and (4b) for distinguishing whether the recorded television signal is NTSC system or PAL (or SECAM) system. The sections (5a) and (5b) are ones providing for a discrimination item which may be required in future.

As shown in FIG. 3, a reproducing apparatus 50 substantially comprises a jacket opening enlarging mechanism 51, a turntable 52 to rotate the disc 15 positioned thereon, a disc holding mechanism 53 for clamping the disc 15, a lid plate locking mechanism 54 for locking the lid plate 12, and the like.

The jacket opening enlarging mechanism 51 comprises upper and lower beams 56 and 57 extending in the directions of the arrows Y1 and Y2, and the supporting member 60 and 61 (sliders) which are respectively fixedly inserted into the guide rails 58 and 59, to support both ends of the respective beams 56 and 57.

A pickup frame 62 is provided with a reproducing stylus 63 and a cantilever 64, and moves in the directions of the arrows Y1 and Y2 by means of a transporting mechanism 65.

The disc holding mechanism 53 and the lid plate locking mechanism 54 are constructed symmetrically on the left and right sides with respect to a line which passes through the center of the turntable in the direction of the arrow X1.

The disc holding mechanism 53 is provided at the inner part of the reproducing apparatus 50 on the opposite side of an inserting opening 66, and comprises a pair of upper and lower holding fingers 67 and 68.

Upon reproduction of the disc 15, the disc case 10 is inserted through the inserting opening 66 of the reproducing apparatus 50, by inserting the disc case 10 with the side of the lid plate 12 into the direction of the arrow X1. When the jacket opening enlarging mechanism 51 is pushed and moved in the direction of the arrow X1 by the disc case 10. When the enlarging mechanism 51 moves, the upper and lower beams 56 and 57 rotate, and enlarging fingers 69 thus respectively move in a direction to mutually separate from each other. Accordingly, the tip ends of the enlarging fingers 69 engage with engaging windows 25 of the jacket 11, and enlarge the front part of the upper and lower jacket halves 13 upwards and downwards, to enlarge the opening.

When the disc case 10 is inserted into the innermost part of the reproducing apparatus 50 together with the enlarging mechanism 51 through the upper side of the turntable 52, the lid plate 12 is locked at the cutouts 22a and 22b by the locking mechanism 54 and supported at the innermost part of the reproducing apparatus 50 in a state in which the lid plate 12 is placed and supported on supporting fingers 70 and 70.

Furthermore, engagement releasing members 71 and 71 enter inside the openings on the right and left sides of the disc case 10, and push the sloping surfaces at the tip ends of the engaging arms 18. Accordingly, the engaging arms 18 are respectively distorted inwards, and the projections 19 respectively slip out from the depressions 20, to release the engagement of the lid plate 12 with respect to the jacket 11 (refer to FIGS. 4 and 5).

The disc 15 is held at a predetermined height by a lower holding finger 68 and an upper holding finger 69.

Next, the jacket 11 is pulled out in the direction of the arrow X2. Since the lid plate 12 and the disc 15 are respectively locked and clamped as described above, only the jacket 11 is moved in the direction of the arrow X2, leaving behind the lid plate 12 and the disc 15. Accompanied by this pulling out of the jacket 11, the lid plate 12 and the disc 15 are relatively pulled out from within the jacket 11. When the jacket 11 is pulled out, the disc 15 is supported horizontally at a position above the turntable 52, by the holding fingers 67 and 68 and a disc clamping mechanism 73 which is at a lifted position.

When a play button (not shown) is then pushed, the disc holding mechanism 53 operate to release the disc 15 and the disc clamping mechanism 73 moves downwards. Hence, the disc 15 moves down and is placed on the turntable 52, and is rotated clockwise. The pickup frame 62 moves in the direction of the arrow Y1 from the waiting position. Thus, the disc 15 is relatively scanned by the reproducing stylus 63, to reproduce the information signal.

Next, an operation in which the disc 15 is recovered from within the reproducing apparatus 50, will now be described.

Upon completion of the reproducing operation, the disc clamping mechanism 73 thus moves up to push the disc 15 up. Furthermore, the holding mechanism 53 holds the disc 15.

Upon recovering of the disc 15, the empty jacket 11 is inserted with its front end first into the reproducing apparatus 50 through the inserting opening 66. The jacket opening enlarging mechanism 51 is pushed by the jacket 11 and moves again in the direction of the arrow X1, to enlarge the opening of the jacket 11. Accompanied by the insertion of the jacket 11 in the direction of the arrow X1, the disc 15 is relatively inserted inside the jacket 11 through the opening.

When the jacket 11 is inserted into the innermost position inside the reproducing apparatus 50, the disc 15 becomes completely incased within the jacket 11, and furthermore, the locked lid plate 12 is relatively inserted within the opening of the jacket 11.

When the jacket 11 is inserted into the final position, the disc 15 is accommodated within the jacket 11, and the main part of the lid plate 12 which has been locked, is inserted inside the jacket opening.

When the jacket 11 is pulled out in the direction of the arrow X2, the lid plate 12 then moves in the direction of the arrow X2 together with the jacket 11. Accordingly, the disc 15 separates from the reproducing apparatus 50 to be recovered within the disc case 10.

As for detection microswitches provided in the reproducing apparatus 50 so as to cooperate with the lid plate 12, microswitches are disposed not to confront every sections but to confront selectively one section among two sections making the pair with each other. With this construction, the number of microswitches required become one half of the number previously required, and hence organization relating to the microswitches become simple.

According to the present embodiment of the invention, as shown in FIGS. 2 through 5, microswitches 40, 41, 42 and 43 are respectively disposed so as to confront the sections (1a), (3a), (4b) and (2b). These microswitches 40 through 43 are mounted to the above engagement releasing members 71 and 71, which are disposed on the left and right side at the innermost position of the reproducing apparatus 50, but are disposed asymmetrically on the left and right sides with respect to a line m which passes through the center of the turntable 52 in the case inserting direction of the arrow X1.

In relation with disposition of the microswitches 40 through 43, the sections (1a) and (3a) in the first cutout desired portion 24a and the sections (4b) and (2b) in the second cutout desired portion 24b are used for effecting discrimination as to peculiarity of the first side of the disc 15, and the sections (2a) and (4a) in the first cutout desired portion and the sections (3b) and (1b) in the second cutout desired portion 24b are used for discriminating various peculiarity of the second side of the same disc 15.

Among the above sections (1a) through (4a), and (1b) through (4b), no section is provided which is used exclusively for distinguishing whether the disc is loaded or not loaded. According to the present invention, the cutouts and non-cutouts are formed in a manner such that it is able to distinguish states where the disc is being loaded or not, only using the above stated sections.

Next a description will be made about how cutout or non-cutout are determined. A distinction between one state where the disc is being loaded into the reproducing apparatus and another state where the disc is not being loaded may be effected by arranging so that at least one single microswitch out of the microswitches 40 through 43 is pushed by non-cutout of the lid plate 12 upon loading the disc into the reproducing apparatus. In this connection, if the cutouts or non-cutouts are determined so that at least one section out of a group of sections (1a), (3a), (4b), (2b) (or (2a), (4a), (3b), (1b)) is formed as non-cutout, irrespective or types of disc, it is able to eliminate the microswitch exclusively used for distinguishing between disc loading and non-loading states.

According to the present invention, paying attention to that character of the recorded signal is different depending on the types of disc, and that some discs are not necessary to be distinguished as to all of the distinguishing items listed above, the cutout and non-cutout are determined in a manner such that the microswitch 43 or 41 out of the microswitches 40 through 43 is able to distinguish whether the disc is loaded or not.

That is, in a case where the disc 15 is audio disc, distinction between sides and from the video disc is sufficient. Here, the audio disc always has the audio signal of stereo system. Accordingly, not only distinction between television system but also distinction of whether the audio signal is stereo or monaural is not necessary. Accordingly, the section (3a) and (4b) always assume non-cutout. While, in the case where the disc 15 is video disc, it is necessary to distinguish as to items such as side to be reproduced, television system, and system of audio signal. Accordingly, there may sometimes occur an instance wherein all of the sections (1a), (3a), and (4b) assume cutouts. Therefore, if the section (2b) (or (2a)) is determined to assume cutout for the video disc, there may result that all the sections (1a), (3a), (2b) and (4b) assume cutout for the first side of the video disc having specific signals recorded. Hence, although the video disc is loaded, microswitches 40~43 are all kept in an OFF state, being able to detect the state where the disc has been loaded. Taking the above description into account, cutout and non-cutout are determined in a manner such that, for the audio disc wherein the sections (3a) and (4b) (or (3b) and (4a)) always assume non-cutout, the section (2b) (or (2a)) assumes cutout, and that, for the video disc wherein all the sections (1a), (3a) and (4b) may probably assume cutout, the section (2b) (or (2a)) assumes non-cutout.

Accordingly, irrespective of whether the disc 15 is audio disc or video disc, when the disc is loaded, at least one microswitch is necessarily turned ON, thus being capable of distinguishing whether the disc 15 is being loaded into the reproducing apparatus or not.

As for the sections other than the above section ②ⓐ (or ②ⓑ), cutout or non-cutout are determined in a manner such that the section ①ⓐ (or ①ⓑ) assumes cutout when corresponding to the first side of the disc 15, the section ③ⓐ (or ③ⓑ) assumes cutout when the recorded signal is of stereo and assumes non-cutout when the recorded signal is of monaural, and the section ④ⓐ (or ④ⓑ) assumes cutout when the television system is PAL (or SECAM) system and assumes non-cutout when the television signal is NTSC system.

The above description is summarized as indicated in a following table.

TABLE

| cutout desired section | | | type of disc | information recorded | |
|---|---|---|---|---|---|
| 2a, 2b | 3a, 3b | 4a, 4b | | | |
| non-cutout | non-cutout | non-cutout | video disc | monaural | NTSC |
|  |  | cutout |  |  | PAL (SECAM) |
|  | cutout | non-cutout |  | stereo | NTSC |
|  |  | cutout |  |  | PAL (SECAM) |
| cutout | non-cutout | non-cutout | audio disc | stereo | |

Referring back to FIG. 1, the lid plate 12 is used to close the opening 21 of the jacket 11 accommodating the disc 15 having NTSC system color video signal, together with the stereo audio signal, recorded on either side surface thereof. This lid plate 12 thereby has cutout 30, 31 and 32 respectively formed at the sections ①ⓐ and ③ⓐ of the first cutout desired portion 24a and the section ③ⓑ of the second cutout desired portion.

When the disc case 10 having the above lid plate 12 connected thereto is inserted into and is then pulled out from the reproducing apparatus 50 so that the first face 15A of the disc 15 faces upwards, the engagement of the lid plate 12 with respect to the jacket 11 is released and the lid plate 12 is held at the cutouts 22a and 22b by hooks 72 and 72 of the locking mechanism 54 and hence is left at the inner most position of the reproducing apparatus 50 so as to confront the microswitches 40 through 43. A pin 40a of the microswitch 40 enters into the cutout 30 and the microswitch 40 is in the OFF state. Thus, it can be distinguished that the side to be reproduced is the first side 15A of the disc 15. A pin 41a of the microswitch 41 enters into the cutout 31 and the microswitch 41 is in the OFF state. Thus, it can be distinguished that the signal recorded on the first side 15A of the disc 15 is the stereo audio signal.

The microswitches 42 and 43 are pushed at their pins 42a and 43a by the rim 17 of the lid plate 12 and are turned ON. Thus, it can be recognized that the disc 15 loaded is a video disc, and the NTSC system color video signal is recorded on the first side 15A of the disc 15.

When the disc case 10 is inserted into the reproducing apparatus 50 with the side reversed from the above state, with the second side 15B of the disc 15 facing up, the lid plate 12 is locked as indicated in FIG. 5. The pin 41a of the microswitch 41 enters into the cutout 32 and the microswitch 41 is in the OFF state. Thus, it can be recognized that the audio signal recorded on the side to be reproduced is of stereo. The remaining microswitches 40, 42 and 43 are respectively pushed by the rim 17 of the lid plate 12 and are turned ON. By the turning ON of the microswitch 40, it can be distinguished that the side to be reproduced is the second side 15B of the disc 15. Furthermore, by the turning ON of the microswitch 42, it can be distinguished that the television system is NTSC system. Still furthermore, by the turning ON of the microswitch 43, it can be distinguished that the disc loaded is video disc.

In either cases where the disc 15 is loaded with the side 15A facing up or with the reverse side 15B facing up, there exists a microswitches which is turned ON, thus capable of detect that the disc 15 has been loaded. Conversely, when all the microswitches 40 through 43 are in OFF state, it can be detected that the disc 15 is not loaded into the reproducing apparatus 50.

The cutouts of the lid plate 12 and the microswitches 40 through 43 are respectively disposed with sufficiently large pitches. With this arrangement, the above distinguishing operation can be performed correctly even if the lid plate 12 becomes offset somewhat from the predetermined position when the disc is loaded.

A lid plate for the audio disc is of configuration wherein cutouts are formed at sections ①ⓐ, ②ⓐ and ②ⓑ in FIG. 2. When the disc is loaded, the microswitch 43 is kept in the OFF state, to detect the audio disc. The microswitches 41 and 42 are always pushed by the rim 17 of the lid plate 12 and are turned ON. By the output from the microswitches 41 or 42, it can be detected that the disc is being loaded into the reproducing apparatus.

Accordingly, by determining cutout and non-cutout in the desired portion 24a and 24b as listed in the above table, it is capable of distinguishing as to nine items only by using four microswitches 40 through 43.

A microswitch 44 may be provided to confront the section ⑤ⓐ of the first cutout desired portion 24a of the lid plate 12.

Further, as modification of the above embodiment, there may be arranged so that the sections ①ⓐ through ⑤ⓐ in the first cutout desired portion 24a are used for distinguishing peculiarity of the first side 15A of the disc 15, and that the sections ①ⓑ through ⑤ⓑ in the second cutout desired portion 24b are used for distinguishing peculiarity of the second side 15B of the second cutout desired portion 24b. In this case, four microswitches are disposed so that each of which confronts each of sections ①ⓐ through ④ⓐ.

Furthermore, as described above, by arranging sections so that the sections used for the same side of the disc 15 are distributed every other sections between the first and second cutout desired portions 24a and 24b, the microswitches 40 through 43 can be disposed with large intervals therebetween, thereby being advantageous on assemblying operation.

Further, this invention is not limited to these embodiments but various variations and modifications may be made without departing from the scope of the invention.

What is claimed is:

1. A case for a disc-shaped recording medium used in a reproducing apparatus, said reproducing apparatus having a turntable for rotating said disc-shaped recording medium, closing member locking means at the innermost part of said disc shaped recording medium reproducing apparatus, and N detection switches located at the innermost part of said reproducing apparatus and disposed asymmetrically on the left and right sides with respect to a line which passes through the center of said turntable in the disc insertion direction, said case comprising:

a jacket for accommodating said disc-shaped recording medium; and a closing member for closing an opening of said jacket and being locked by said locking means and confront said detection switches when said disc-shaped recording medium is loaded into said reproducing apparatus, said closing member having cutout desired areas which are symmetrical on the left and right sides, each of said sides having N desired sections where cutouts are selectively formed for discrimination between types of said recording medium, said cutout desired sections being positioned for discrimination at symmetrical locations on the left and right side and being brought to confront the same detection switch out of said N detection switches when said closing member is reversed with respect to up and down together with said jacket and said disc-shaped recording medium, one cutout desired section of said pair of cutout desired sections which are symmetrical on the left and right sides being selectively cutout or non-cutout for discriminating a first side of said disc-shaped recording medium, and the other cutout desired section being selectively cutout or non-cutout for discriminating a second side of said disc-shaped recording medium.

2. A case as claimed in claim 1 in which said closing member has a cutout desired section for distinguishing whether a signal recorded on said disc-shaped recording medium is a video signal or an audio signal, and said cutout desired section is in a non-cutout state, when said signal is a video signal, to turn ON the corresponding detection switch.

3. A case as claimed in claim 1 in which said N detection switches are distributed on the left and right sides, and said cutout desired sections for the same side of said disc-shaped recording medium are correspondingly distributed on the left and right between the cutout desired areas on the left and the right sides of said closing member.

4. A case as claimed in claim 1 in which said cutout desired areas of said closing member comprises first cutout desired sections for distinguishing whether a signal recorded on said disc-shaped recording medium is a video signal or an audio signal, second cutout desired sections for distinguishing whether a reproducing side of said disc-shaped recording medium is a first side or a second side, third cutout desired sections for distinguishing types of said audio signal, and fourth cutout desired section for distinguishing the type of television system of said video signal.

5. A case as claimed in claim 4 in which said first through fourth cutout desired sections are determined so that at least one cutout desired section for each side of said disc-shaped recording medium is in a non-cutout state.

* * * * *